(12) United States Patent
Huetter et al.

(10) Patent No.: US 7,984,205 B2
(45) Date of Patent: Jul. 19, 2011

(54) METHOD AND DEVICES FOR THE TRANSFER OF A DATA FLOW FROM A DATA SOURCE TO A DATA SINK

(75) Inventors: Ingo Huetter, Pattensen (DE); Michael Weber, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 246 days.

(21) Appl. No.: 12/083,655

(22) PCT Filed: Oct. 24, 2006

(86) PCT No.: PCT/EP2006/067703
§ 371 (c)(1),
(2), (4) Date: Apr. 16, 2008

(87) PCT Pub. No.: WO2007/051729
PCT Pub. Date: May 10, 2007

(65) Prior Publication Data
US 2009/0240848 A1 Sep. 24, 2009

(30) Foreign Application Priority Data

Nov. 2, 2005 (DE) .......................... 10 2005 052 207

(51) Int. Cl.
*G06F 3/00* (2006.01)
*G06F 13/00* (2006.01)
*G06F 5/00* (2006.01)
(52) U.S. Cl. ............................... 710/29; 710/33; 710/52
(58) Field of Classification Search .................. 710/29, 710/33, 52
See application file for complete search history.

(56) References Cited

U.S. PATENT DOCUMENTS

| 6,154,603 A * | 11/2000 | Willis et al. ................... 386/125 |
| 7,471,629 B2 * | 12/2008 | Melpignano .................. 370/232 |
| 2005/0027788 A1 * | 2/2005 | Koopmans et al. ............ 709/200 |
| 2007/0186228 A1 * | 8/2007 | Ramaswamy et al. .......... 725/14 |

FOREIGN PATENT DOCUMENTS

| EP | 1531601 | 5/2005 |
| WO | WO 98/34405 | 8/1998 |
| WO | WO 03/036962 | 5/2003 |

OTHER PUBLICATIONS

Search Report Dated Feb. 14, 2007.

* cited by examiner

Primary Examiner — Chun-Kuan Lee
Assistant Examiner — Zachary K Huson
(74) Attorney, Agent, or Firm — Robert D. Shedd; Jeffrey M. Navon

(57) ABSTRACT

In the transfer of AV data flows, especially in a network environment, a delayed transition from one operating mode to the other operating mode will be possible when changing the operating mode from e.g. normal replay to fast forward search. This is due to the fact that—in the transfer from data source to data sink different buffer memory stages must be passed before the transferred data finally come to decoding. When the request for changing the operating mode comes, the data already present in the buffer memories must first be processed before the actually requested new data come to be decoded. For the solution of the problem described, it is suggested according to the invention that after the request of changing the operating mode the undesirable data in the buffer memories are quickly eliminated through suitable measures so that the desired data can then be decoded faster. To do that, an identifier for the new operating mode is inserted in the data flow on the part of the data source device. The decoder driver of the decoder in the data sink device will search for the inserted identifier in the data flow and reject all data packets which are not combined with this identifier. Thus, the buffer memory stages are discharged fast and a smooth transition with the change of operating mode will be realized.

10 Claims, 6 Drawing Sheets

Get/item/MenInBlack.mpg HTTP/1.1
Host:www.my.server
AV_SPEED:forward_3

HTTP/1.1 210 Trickmode OK
Date: Fri, 31 Dec 2003 17:59:59 GMT
Content-Type: video / mpeg
Transfer-Encoding: chunked
1EAEO; FF3
I - Frame-Data
OCEB5B; FF3
P - Frame-Data
OAB3A; FF3
P - Frame-Data
.
.
.
0

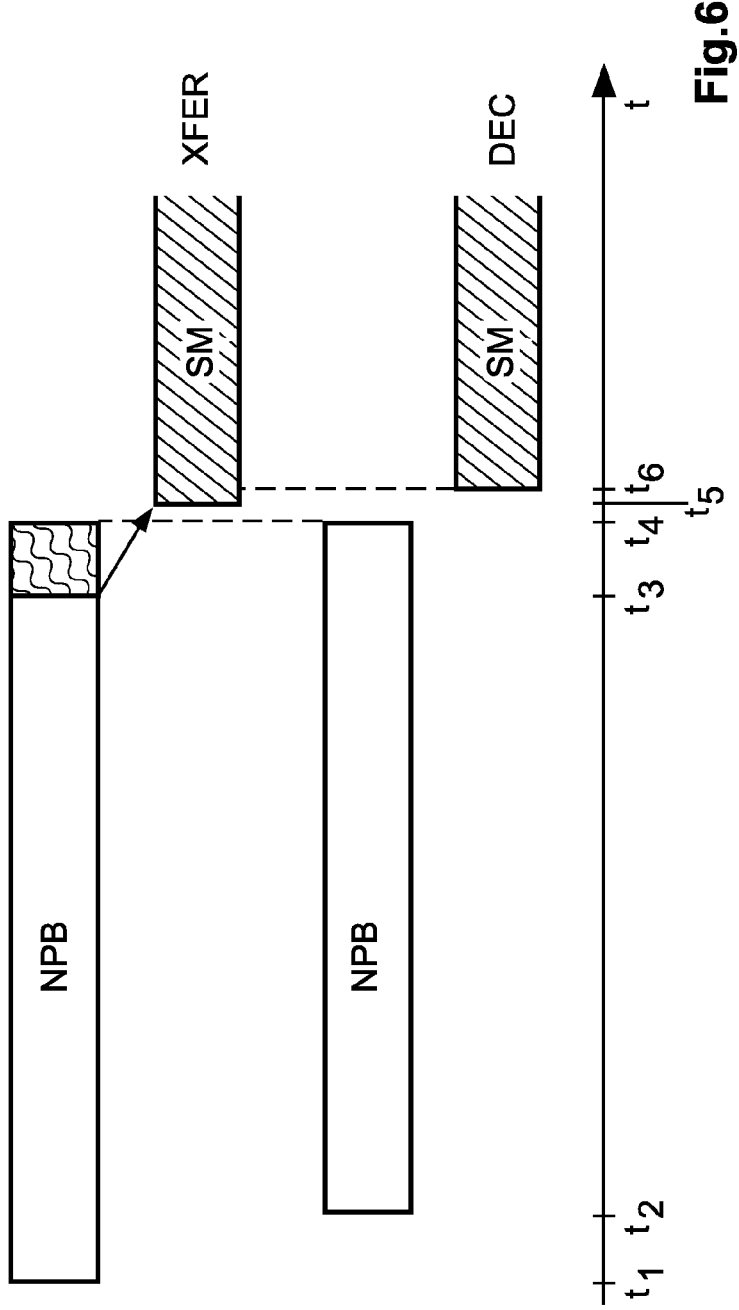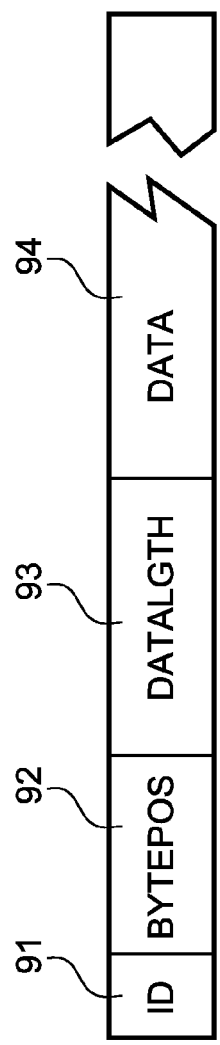

Get/item/MenInBlack.mpg HTTP/1.1
Host:www.my.server
AV_SPEED: SM
DECODER TIME: 01.02.03.03

HTTP/1.1 210 Trickmode OK
Date: Fri, 31 Dec 2003 17:59:59 GMT
Content-Type: video / mpeg
Transfer-Encoding: chunked
1EAE0; time =01:02:03:04, SM
I - Frame-Data
1EAE0; time =01:02:03:04, SM
I - Frame-Data
1EAE0; time =01:02:03:04, SM
I - Frame-Data
.
.
.
0

METHOD AND DEVICES FOR THE TRANSFER OF A DATA FLOW FROM A DATA SOURCE TO A DATA SINK

This application claims the benefit, under 35 U.S.C. §365 of International Application PCT/EP2006/067703, filed Oct. 24, 2006, which was published in accordance with PCT Article 21(2) on May 10, 2007 in English and which claims the benefit of German patent application No. 10 2005 052 207.6, filed Nov. 2, 2005.

The invention relates to the technical field of trick mode replay of multimedia contents, especially video or audio contents with special reference to the trick mode generation in a network environment, such as a home network, for example.

BACKGROUND OF THE INVENTION

The transfer of AV data flows between a data source and a data sink is the subject of a multitude of investigations and standardization efforts in the industry. Exemplary networking systems having been specified have become known by the abbreviations HAVi (Home Audio/Video interoperability) and UPnP (Universal Plug and Play). The transfer of AV data flows has been particularly taken into account in these network systems since the HAVi system has been primarily developed for this case of application, and with regard to the UPnP system, a working group of the UPnP forum developed a UPnP AV specification which is based on the general UPnP specification and expands it. The designation of this specification is UPnP AV Architecture: 0.83 of 12 Jun. 2002.

The mentioned specifications support the detection of AV devices, setting up AV connections, finding AV contents, operating the data source and data sink device, replay of selected AV contents in the mode of normal replay and in trick mode replay, etc.

Trick mode replay shows a behavior which is problematic. For that, the data transfer between two devices A and B in the network will be considered in detail. It is assumed that device A is a data source—such as, e.g. a digital video recorder which is hard disk based and has AV contents stored. Device B should serve as data sink, e.g. as a display device. Both devices are provided with a communication interface for data exchange as well as for the exchange of control commands. In data transfer (which can be done e.g. in TCP/IP based networks via HTTP or via RTP), the data must, as a rule, go through different buffer memories. The transfer network itself can also be considered a memory in this sense because even this transfer can result in delays on the net.

The replay of AV contents is relatively simple in case of normal replay (thus with simple replay speed). Via the communication interface, the devices are informed which content is to be sent where and, respectively, what they are to receive; and then, replay can start. However, it will be problematic with the so-called trick modes (fast forward, fast reverse, slow motion, still image). As an example, a case will be considered where the AV system is in normal replay mode and will then be switched, without pause, to a higher forward speed, e.g. triple search function.

It is here assumed that the device A supports so-called "server side" trick modes, i.e. that the source will modify the data flow such that the receiver will receive a valid data flow from which the images not to be shown have already been removed. For that, a corresponding trick mode module is looped into the data path in device A.

The data generated by this module must now run through the memories on the transfer path, e.g. a sender memory, a receiver memory, and a buffer memory for the data decoder. That means the data still existing in these memories at the time of switching must actually still be decoded by the decoder in device B before the trick mode specific data can be decoded.

This characteristic is problematic, and the user perceives it as inertia of the system, i.e. after the user informed the system of the intention to change to a forward function, replay will still continue as before and will actually change to fast forward only after a certain period of time. The amount of this time delay essentially depends on the size of the available memories.

INVENTION

It is the object of the invention to provide a method and corresponding devices by means of which the mentioned time delay can be minimized so that the user will find the system less sluggish. The solution according to the invention is based on the deletion of data which was still present in the memories upon the user's request to change into trick mode. To do this, a measure is proposed which is carried out in the receiver device. That device will actually receive the irrelevant data, but will not decode it, rather ignore it instead. Yet, for its realization, the receiver device must know when the relevant data begins (in the example that belonging to the newly set trick mode). This problem will be solved by embedding additional control data in the AV data flow. The additional control data identify the subsequent AV data as uniquely belonging to a specific action.

The following scenarios are possible with regard to the action flow:

In device A, the user triggers the request regarding the change of operating mode. Device A generates an identifier later inserted into the data flow and sends it to device B via the communication interface asynchronously to the AV data flow. Device B thus knows that—in the future—it should only replay AV data which are marked with this identifier. The source device A now switches over the data path of trick mode and inserts the said identifier into the new data.

The user triggers the operating request in device B. Via the communication interface, the operating request is transferred to device A. This message already includes an identifier for the operating request. Simultaneously with the transfer of the operating request, a control command is sent in the device B itself which informs the decoder that, in the future, it should only decode AV data which is provided with the advised identifier or which are preceded by this identifier. Device B can thus "scrap" the data not being part of the operating request and, after changing into the trick mode, device A will insert the identifier into the data flow.

The measures specified in the dependent claims will enable advantageous further developments and improvements of the method according to the invention.

It is recommended, for example, that the additional control data are not only once integrated into the data flow but will be repeated at regular intervals. In case of a transfer via insecure transfer ways (e.g. in case of a transfer according to the RTP protocol), any possible loss of data on the transfer path (e.g. caused by intervening wireless data connections) would not cause irritating failures. Moreover, additional data sinks—connected at a later point in time with a data source already sending data—would receive information about the command triggering the sending or, respectively, the current operating mode of the data source device.

It is recommended that the operating mode identifier will be integrated—within the scope of the OSI/ISO layer model of data communication—in the data flow on the transport layer since this will not require any manipulation of the useful load data flow.

If, for example, the HTTP protocol is used for the transfer of the AV data flow, an operating mode suggests itself especially in trick mode replay—that of the so-called chunked transfer encoding according to the HTTP 1.1 specification. In this transfer method, the useful data are transferred in blocks of various length, the block length being transferred as a hexadecimal number before the actual block. In this transfer mode, it is possible to also insert comment text behind the indication of the block length, separated by a semicolon. It is precisely this comment text which can be used for the transfer of the said identifier within the scope of the invention.

In an AV data flow transfer by means of the RTP protocol, a so-called X-bit can be set in the header of the RTP packet. When this bit is set, an additional header can be added to the standard header as a so-called "RTP header extension". The identifier according to the invention can also be inserted in this additional header.

When switching from normal replay to forward or reverse at a higher speed, there may be skips due to the erasing or, respectively, "scrapping" of the buffer memories when changing from one replay mode to another. When changing from the normal operating mode to trick mode at a higher speed, this will not pose any problems; because, as a rule, possible skips in replay are not irritating as the change to forward or reverse was actually made to get faster to a desired replay point, and skips also occur in the trick modes themselves. This does not apply for the trick mode of slow motion or still image replay when a video film is played. To achieve a smooth transition from normal replay to trick mode replay, it will therefore be suggested that the data sink device additionally informs the data source device about what had been the last decoded multimedia content. When this information is not available in the useful data flow, it is accordingly advantageous that the data source device inserts additional information into the AV data flow which will allow device B to determine the exact position information. According to another measure of the invention, it will then be further provided that the data sink device informs the data source device up to which point the decoding has progressed. The data source device can then re-align the trick mode replay to precisely this point and start with the trick mode data flow generation at the point where the replay had been interrupted before.

It is especially advantageous to regularly transfer the exact data position in the data flow from the data source device to the data sink device. Based on that, the data sink device can identify the point at which replay was interrupted. Alternatively, it would also be possible to transfer the time code instead of the data position or even both together. The time code information can also be used, for example, in the data sink device at the same time as a source information for displaying a replay counter.

Claims 8 and 9 list correspondingly advantageous measures for a data sink device according to the invention. Claims 10 to 16 list advantageous measures for a data source device according to the invention.

The invention can also be advantageously used when data source and data sink are not positioned in different devices connected by a network but are instead provided in a single device. Claim 17 lists the measures according to the invention for such a device for performing the method according to the invention.

DRAWINGS

Exemplary embodiments of the invention are shown in the drawings and will be explained in more detail in the following description:

In the Figures:

FIG. 1 shows an example of a home network;

FIG. 2 a rough block diagram of a data source device, as well as a data sink device connected via the network;

FIG. 3 the time flow of the replay function or, respectively, the decoding function when changing the operating mode according to the invention;

FIG. 6 shows the time flow of the replay function or, respectively, the decoding function when changing from normal replay to slow motion replay;

Figure 7:
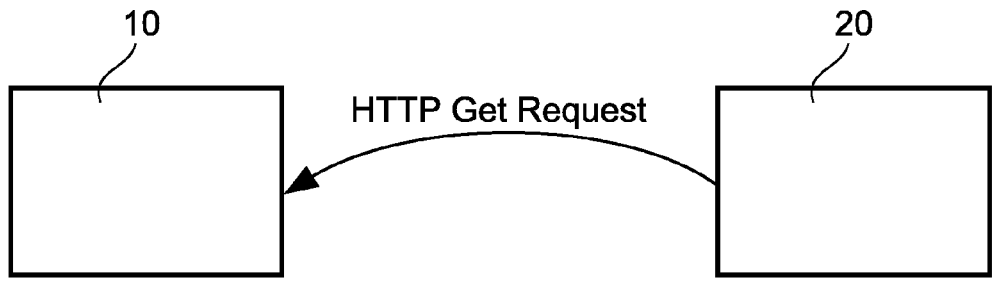
Figure 8:
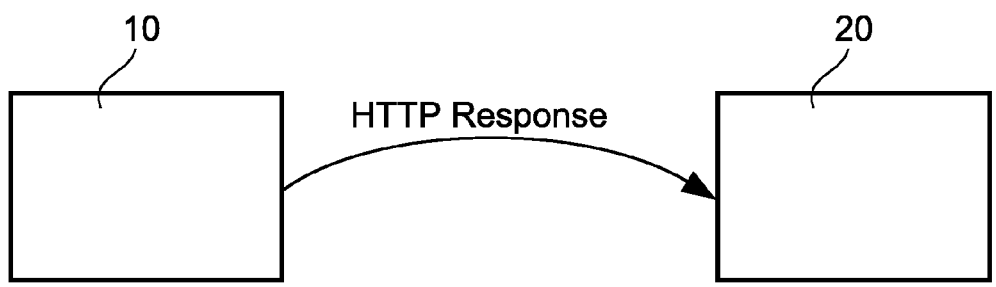

FIG. 7 the format of the associated HTTP get request which is sent from the data sink device to the data source device;

FIG. 8 the format of the associated HTTP get response; and

FIG. 9 the format of a data packet which is used in a decoder memory of the data sink device.

DESCRIPTION OF THE INVENTION

Figure 1:
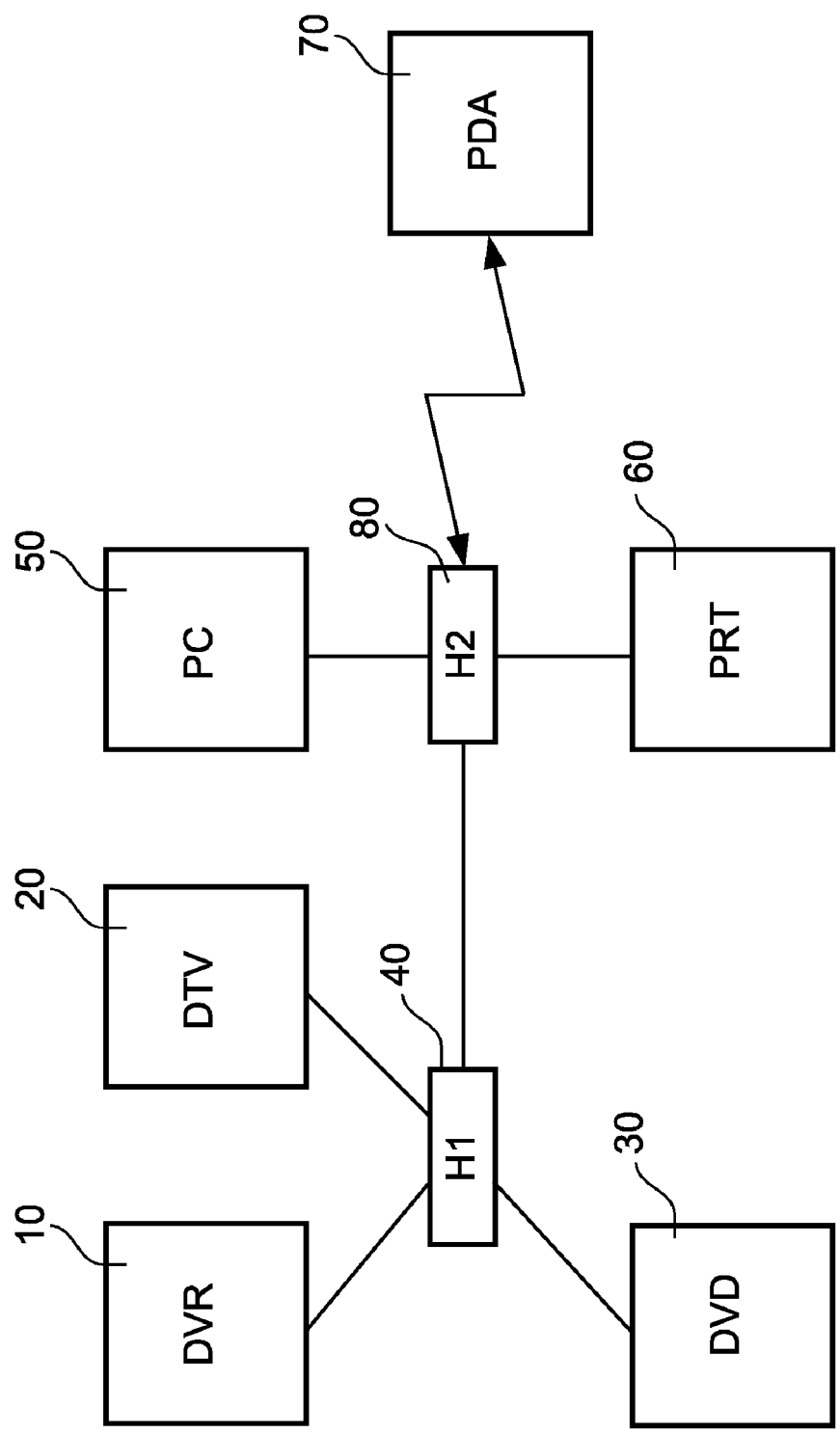

FIG. 1 shows a digital video recorder DVR with the reference number 10. It is provided with mass storage to store video and audio contents. Today's standard digital video recorders have a hard disk for this purpose. The reference number 20 designates a digital TV device, DTV. This may be a flat screen device, such as LCD or plasma TV, with an integrated decoder for digital audio and video signals. The reference number 30 designates a DVD player. All devices 10 to 30 are networked. In the example according to FIG. 1, a network connecting switch unit 40 is provided for this which is also known as "network switch" or "router", respectively. The data in the network can be transferred according to the Ethernet protocol. The commercially available Ethernet network cables can be used as network cables. For the transfer of AV data flows, the use of a network cable for 100 Mbit Ethernet will be already adequate since the data are transferred in compressed condition.

Reference number 50 designates a personal computer and reference number 60 a printer. These two devices are connected via their own network connection switch unit 80 to the rest of the network. Additionally, the network comprises a personal data assistant 70 as a network user station. This device is, however, wirelessly connected with the network via a corresponding wireless connection route which is supported by the network connection switch unit 80.

Figure 2:
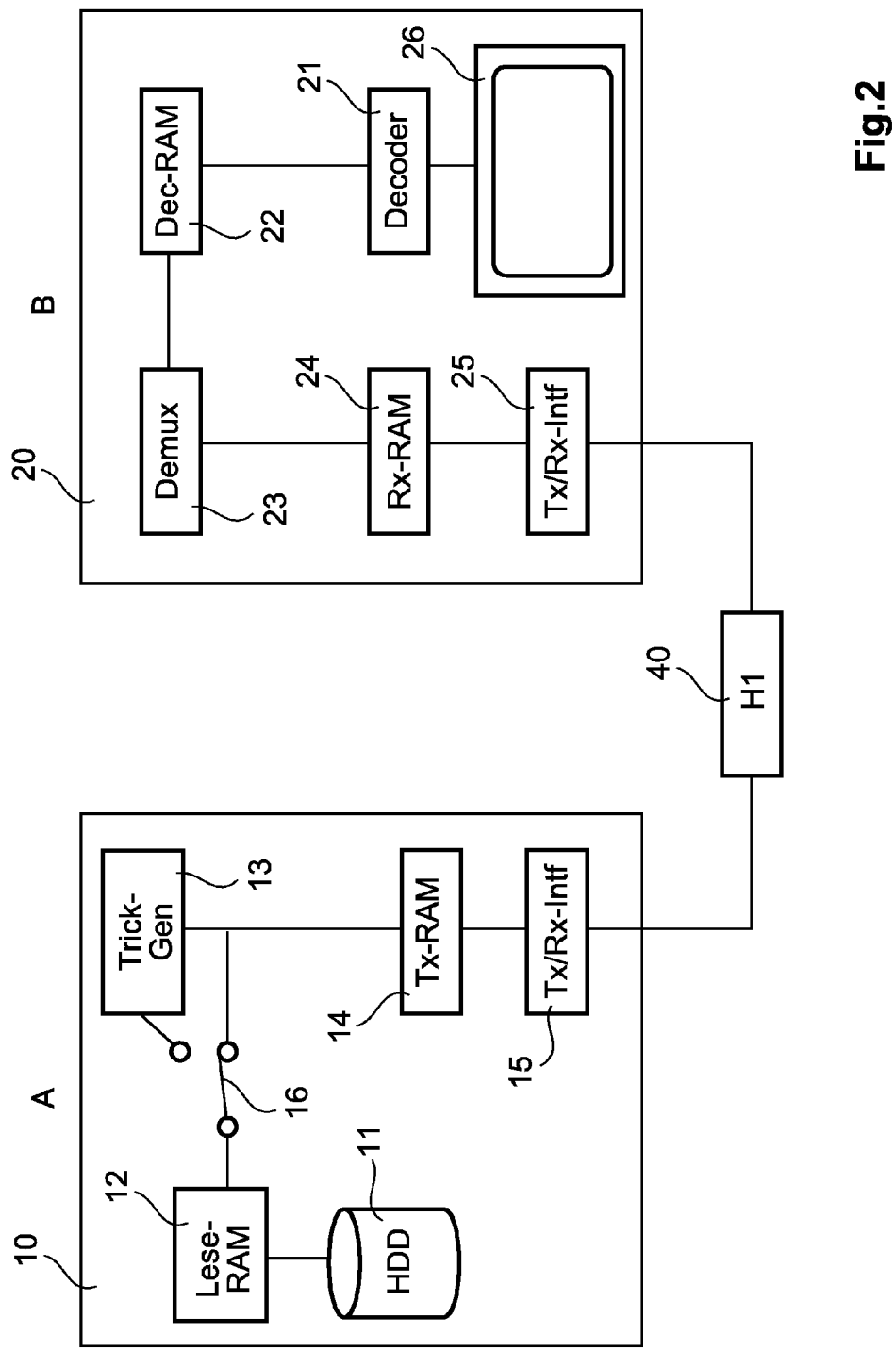

FIG. 2 shows the two devices—data source device 10 and data sink device 20—which are connected with each other, and their structure by means of the pertinent rough block diagrams. A hard disk 11 is provided as mass storage in the digital video recorder 10. When reading data from the hard disk 11, the data read will first go into a read memory 12. It is supposed that the data in mass storage 11 are already stored in coded form, compressed. In normal replay, the data are not recoded so that the data path goes from the hard disk 11 via the read memory 12 directly to the sending memory 14; and from there, the data are transferred via the communication interface 15 via the network to the data sink device 20. The algorithms known in the state of the art for filling the sending memory 14 can be used in the data source device 10.

When switching into a trick mode, the data path within the data source device 10 will also be switched over. Taken into account as trick modes will be the known modes of fast forward, fast reverse, slow motion, as well as still image replay. As mentioned, the data are stored in compressed condition and encoded in the mass storage 11. If e.g. the MPEG2 encoding method is used for video coding, switching into a trick mode of any speed will require that the data are recoded. As is known, three different types of images are used according to the MPEG2 video encoding method. These are intra-coded images I, unidirectionally predicated images P, as well as bidirectionally predicated images B.

The different types of images can appear in the data flow according to the MPEG2 standard in determinate or arbitrary sequence. Since the I and P images depend on the preceding or, respectively, succeeding images, they cannot simply be transferred singularly but only together with the pertinent basic images. This is one difficulty in the realization of trick modes. For this reason, it has been suggested in the state of the art to actually decode the MPEG2 data flow existing in mass storage to generate trick mode replays, and then re-encode them to have again new freedom in the selection of the images to be transferred. For this, a trick mode generator 13 is provided in the data source device 10. Said generator will be looped in the data path upon switching over to trick mode replay. The MPEG2 data present in the read memory 12 will then be recoded so that a new MPEG2 data flow is generated which then passes into the sending memory 14. The switchover is shown in FIG. 2 by means of a switching unit 16.

As shown, the transferred data get via the network into the data sink device 20. As described, this is a digital TV device which comprises as major components a decoder 21 and a display unit 26. It is assumed that a plasma or LCD panel is used as a display unit. The decoder 21 is an MPEG2 decoder, for example. A buffer memory 22 is assigned to it as a decoding memory. However, the data first pass into the device via the communication interface 25 and will then be provided in a receiving buffer memory 24. A demultiplexer unit 23 provides for the distribution of the data to the different decoder units of which only the video decoder unit 21 is shown in the block diagram. The digital TV device 20 is provided in standard manner with a remote control by means of which the user can operate the device.

Figure 3:
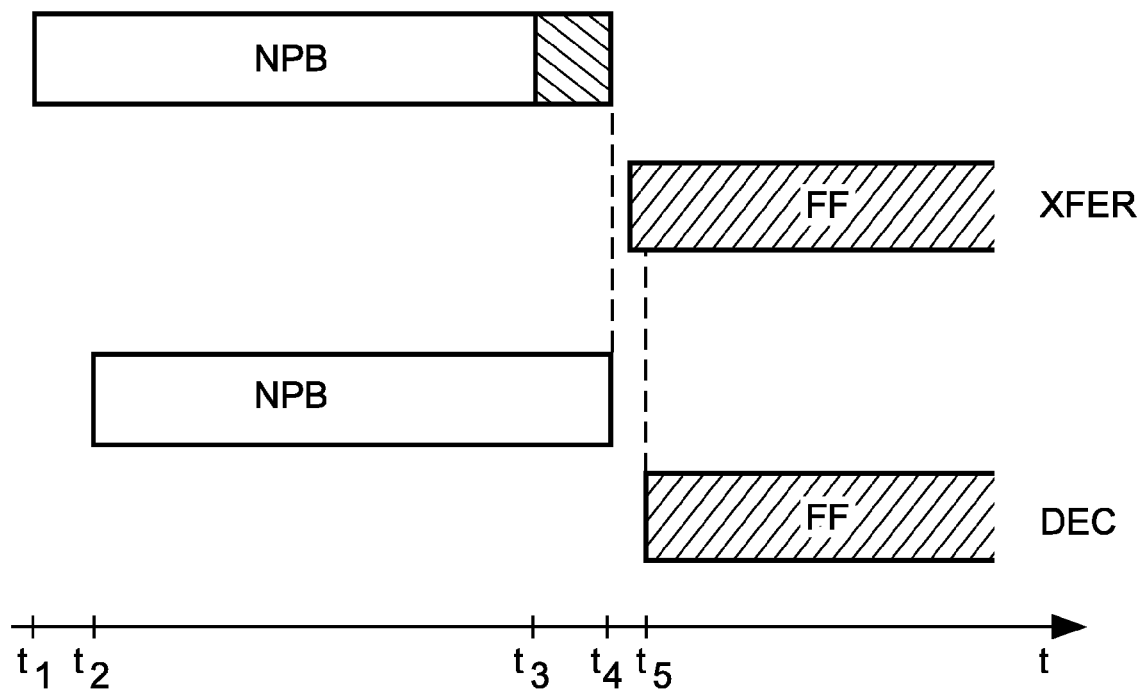

The mode of operation of the arrangement according to FIG. 2 is explained below on the basis of FIG. 3. It is supposed that the digital TV device 20 receives a video data flow from the data source device 10 and displays the associated content with normal replay mode. At time t1, the data source device 10 starts sending the data flow for normal replay. Some time will pass until the buffer memories are filled—the receiving buffer memory 24 and the decoder buffer memory 22. At time t2, replay of the received data flow will start in the data sink device 20. Thus, the content received will be decoded with a certain time delay. At time t3, the operating person interrupts the normal replay and instead requests changing into a trick mode replay, for example, triple search run in forward direction. The communication interface 25 in the data sink device 20 sends this request to the data source device 10. This will thereupon stop further sending of data. The upper part of FIG. 3 shows which part of the data has been respectively transferred. As shown, at time t4, the data part marked by hatched lines has been transferred to the data sink device 20. The lower part of FIG. 3 shows which percentage of data in the data sink device is already decoded. As described, there is a delay between the receipt of data and the start of decoding. At time t4, decoding of the data hatched in the upper part has not yet taken place. Since normal replay was interrupted at time t4, there are still data in the buffer memories 24 and 22 which had been transferred between time t3 and time t4.

To realize a fast change in the requested trick mode, these data are removed according to the invention from the buffer memories 24 and 22. This is done in such manner that—upon transfer of the trick mode request on the part of the data sink device 20—an identifier is notified to the data source device 10. After the data path within the data source device has been switched over, the trick mode generator 13 inserts the notified identifier into the newly generated data flow. The decoder driver in the data sink device 20 will then check, prior to the decoding of a data packet, whether it contains the transferred identifier. As long as this is not yet the case, the data packet is rejected and thus will not be decoded. Accordingly, the decoder memory 22 will be discharged fast and filled again with new fresh data from the receiving memory 24. The entire part of the data flow will be rejected which was hatched in FIG. 3 between time t3 and t4. Additionally that data part as well which was already in the sending buffer 14 of the data source device 10 before it was changed to trick mode. When the notified identifier is found for the first time in the data flow, decoding of the subsequent data packets will start. This will be the case at time t5 in the presentation according to FIG. 3.

Figure 4:
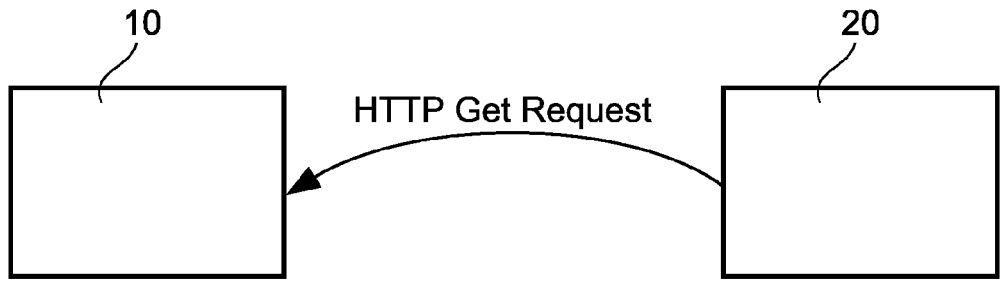
FIG. 4 shows an HTTP get request for changing from normal replay to search mode.

FIG. 4 shows the exemplary HTTP get request which is made on the part of the data sink device 20 to the data source device 10 for requesting the change from normal replay to forward search mode with triple speed. In the example shown, the requested file name will follow after the keyword Get. This is signalized by the parameter name ITEM. As an example, the file name meninblack.mpg is indicated. After the HTTP version information in the same line, in the next line will follow the information as to where this file is to be found. To designate this parameter, the term 'host' precedes the server name in the second line.

Finally, another line will have a parameter for the search speed and the replay direction. The parameter name is accordingly AV_Speed. In the example shown, the parameter information is the term forward_3 which means that fast search should be done in forward direction and triple speed.

Figure 5:
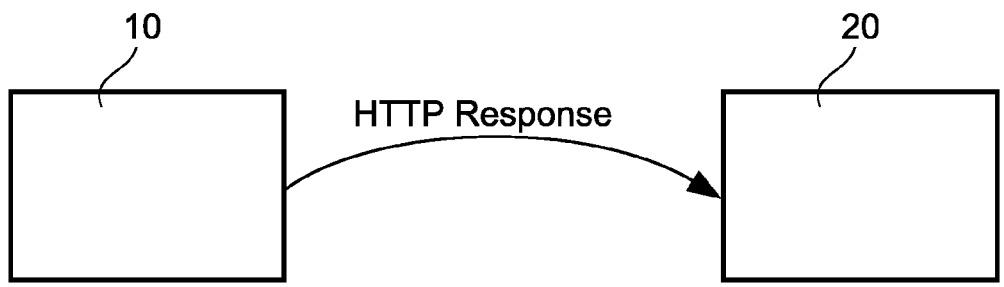
FIG. 5 shows the response to the HTTP get request according to FIG. 4.

Within the scope of HTTP get, the transfer mode "chunked transfer encoding" suggests itself for the transfer of trick mode data. Reference is made in this respect to the publication of an earlier application by the Applicant, with the publication number EP-A-1 531 601. Within the scope of disclosure of the invention, reference is explicitly made to this document. FIG. 5 shows the response on the part of the source device 10 to the HTTP get request. The first line provides the status report for a successfully received HTTP get request. It also includes the version information regarding the HTTP process. The second line indicates the date and the time of day. The third line will signalize via the keyword Content Type which data type will be subsequently transferred. The mentioned example concerns video data encoded in MPEG2 format. The fourth line then signalizes that the subsequent transfer will be made in the "chunked transfer encoding" mode. Subsequently, the first data section will be sent. It is preceded by the length indication of the corresponding data section as a hexadecimal number. Separated from the length indication by a semicolon, comment text can be provided after the HTTP specification. This will be used for the invention to transfer the identifier which the decoding unit in the data sink device 20 should pay attention to. The example simply indicates FF3 as the information that the data flow is equivalent to the operating mode of fast forward at triple speed. FIG. 5 shows that this information will be transferred with each transferred data section of the "chunked transfer encoding" mode. This is not absolutely required according to the invention, but has the advantages described in the beginning.

FIG. 6 shows the time conditions in the special case of changing from the normal replay operating mode to the slow motion operating mode. Normal replay will again be stopped at time t4. In that case, however, the change should be to the slow motion operating mode in which a smooth transition between normal replay and slow motion will be important. This will now be realized according to the invention such that the time of the last decoded image will also be indicated in the HTTP get request on the part of the data sink device 20 to the data source device 10. The pertinent HTTP get request is shown in FIG. 7. The parameter AV_speed has the entry SM for slow motion. Underneath, the time 01:02:03:03 is indicated as the decoder time. The data source device 10 will thus be informed about the last decoded image in the data sink device 20. For a smooth transition from normal replay to slow motion, the data source device 10 sends the newly coded data flow beginning as of the image subsequently to be displayed, with the time code 01:02:03:04. The time information is provided, separated by a semicolon, behind the length indication of the data block in the "chunked transfer encoding" mode. Separated from the time information by a comma, the identifier of the newly started operating mode SM will also follow. On the basis of this identifier, the data source device 20 can determine once more when it must start the decoding of data again. All data will be rejected which are read from the decoder memory 22 until the arrival of the new data flow including identifier SM. At time t6 according to FIG. 6, decoding of the new data flow will start. Hatched lines will emphasize that the data decoded in time t6 do not precisely correspond with the data transferred between time t3 and t4 because—as is shown in FIG. 8—the data flow for slow motion replay has been specifically recoded. Such recoded data were received as of time t5 in the data sink device 20; however, they correspond—with regard to the starting time code—with the data transferred as of time t3. Thus, a smooth transition from normal replay to slow motion replay will then be possible.

Instead of the time code information, the absolute byte position of the start of the corresponding block can be alternatively transferred as a parameter. The possible objection that this position can be theoretically determined by the receiver itself by counting the data bytes received is not correct since that is only possible in replay at normal speed. As soon as it is switched between normal replay and trick mode, the received byte number no longer corresponds with the position in the original document, due to the trick mode recoding done at the data source device.

If RTP (real time protocol)—instead of the HTTP protocol—is used for the transfer of data, the additional information can be appended in the form of an extra header to the standard header of an RTP packet. In this case, the so-called X-bit is set in the standard header of the RTP packet.

As shown in FIG. 2, the transport packets (HTTP packets or RTP packets) first go to the communication interface 25 in the data sink device 20. These data packets are, however, not processed therein; and, subsequently, only the useful data content is transferred into the receiving memory 24. This requires the format for storing the useful data of the packet in the receiving memory 24 to be determined such that the information of identifier, time code information or, respectively, byte position information, data length and useful data will follow consecutively. The corresponding storage format is shown in FIG. 9. Reference number 91 marks the identifier ID. Reference number 92 designates the field for the byte position information or, respectively, the time code. Reference number 93 designates the field in which the length of the data block is indicated. Reference number 94 then indicates the useful data of the packet. This format will also be maintained in the further data path within the data sink device 20 so that the data will also be received in this format in the decoder memory 22. The decoder driver for the decoder 21 can then analyze the entries and begin decoding the new content as of the data block at which the desired identifier 91 occurs for the first time.

The invention was described with exemplary embodiments regarding the application in a home network. It is basically also possible to use the same method when the devices of data source device and data target device are not operated as separate devices in a network but as modules in a single device, for example, modules in a DVD player.

The invention claimed is:

1. Method for the transfer of a data flow from a data source to a data sink, wherein the data flow is composed of a number of data sets, the method comprising the following steps:
   a) sending a data packet on the part of the data source;
   b) receiving the data packet on the part of the data sink;
   c) temporary storage of the data packet in a buffer memory inside the data sink;
   d) decoding the data of the data packet in the buffer memory;
   e) receiving at the data source a request from the data sink for changing into another operating mode, the request being connected with an identifier for data identification;
   f) sending the identifier for designating that the subsequent data packet(s) is (are) sent according to the new operating mode, on the part of the data source;
   comprising the steps:
   g) removing the data packet(s) from the buffer memory in the data sink which were received before the identifier had been communicated with the request and thus is(are) not connected with the identifier;
   h) receiving the identifier and a data packet on the part of the data sink;
   i) temporary storage of the data packet in the buffer memory of the data sink;
   j) checking in the data sink whether the identifier was received before or together with the data packet and, if affirmative, decoding the data of the data packet in the buffer memory of the data sink.

2. Method according to claim 1, wherein the identifier is inserted in the data flow at regular intervals.

3. Method according to claim 1, wherein the identifier is inserted in the data flow on the transport layer according to the OSI/ISO layer model of data communication.

4. Method according to claim 3, wherein the identifier is part of a transport packet.

5. Method according to claim 1, wherein the data flow concerns a data flow which is transferred according to the HTTP protocol—analog Hyper Text Transfer Protocol—in the "chunked transfer encoding" mode and wherein the identifier is inserted, after indication of the block length, as a comment text in an HTTP data packet.

6. Method according to claim 1, wherein the data flow concerns a data flow which is transferred according to the RTP protocol—analog Real Time Protocol—and wherein the identifier is inserted in an additional header of the RTP data packet.

7. Method according to claim 1, wherein the absolute data position and/or the playing time position are additionally indicated in a data packet.

8. Data sink device for performing the method according to any one of the preceding claims, with a sending and receiving interface, with a decoding unit, with means for generating a request for changing to another operating mode, wherein the request will be combined with an identifier and can be sent, via the sending and receiving interface, to a data source device, wherein storage management means are provided which, after the request is generated, will remove one or a plurality of data packets from the buffer memory and provide decoding of the data packets as of that data packet which is combined with the identifier.

9. Data sink device according to claim 8, wherein the storage management means are designed such that they store a data packet together with the identifier in the buffer memory.

10. Device for performing the method according to claim 1, with a data source and a data sink, with means for providing a data flow according to a first and a second operating mode, with a decoding unit and a buffer memory for the decoding unit with means for generating a request for changing into another operating mode which is combined with an identifier, wherein—after receiving the request for a change in the operating mode—the means of provision of data flows will generate a data flow which comprises the identifier of the requested operating mode according to the request, and characterized in that storage management means are provided for the buffer memory which—after the request is generated—will remove one or a plurality of data packets from the buffer memory in the data sink and decode the data packets as of that data packet which is combined with the identifier.

* * * * *